United States Patent [19]

Martig, Jr.

[11] 4,058,011

[45] * Nov. 15, 1977

[54] FLOW MONITORING APPARATUS

[75] Inventor: Kenneth W. Martig, Jr., Olympia, Wash.

[73] Assignee: Pro-Tech, Inc., Paoli, Pa.

[*] Notice: The portion of the term of this patent subsequent to Oct. 14, 1993, has been disclaimed.

[21] Appl. No.: 695,545

[22] Filed: June 14, 1976

Related U.S. Application Data

[63] Continuation of Ser. No. 503,392, Sept. 5, 1974, Pat. No. 3,965,740.

[51] Int. Cl.² ............................................. G01F 1/20
[52] U.S. Cl. .................................... 73/194 R; 73/215; 73/302
[58] Field of Search .................... 73/194 R, 302, 215, 73/212, 439, 298; 239/273, 279, 280, 525, 530, 532; 248/75

[56] References Cited

U.S. PATENT DOCUMENTS

| 2,561,171 | 7/1951 | Bickley | 73/301 X |
| 3,475,959 | 11/1969 | Glassey | 73/302 X |
| 3,573,019 | 3/1971 | Rees | 73/212 X |
| 3,638,490 | 2/1972 | Buettner | 73/194 R X |
| 3,727,459 | 4/1973 | Buettner | 73/205 R |
| 3,929,017 | 12/1975 | Kowalski | 73/215 X |
| 3,965,740 | 6/1976 | Martig, Jr. | 73/194 R |

OTHER PUBLICATIONS

J. B. Shah - "Simple Method for Wastewater Flow Measurement," *Journal Water Poll. Control Fed.*, vol. 45, No. 5, May 1973, pp. 932-935.

*Primary Examiner*—Charles A. Ruehl
*Attorney, Agent, or Firm*—Charles A. McClure

[57] ABSTRACT

A method and portable apparatus for continually monitoring the flow of fluid in an open channel such as in a conduit having a known diameter, a known slope and of material having known surface characteristics. The liquid depth within the pipe is determined by means of an elongated hollow probe placed axially in the bottom of a channel containing the liquid and forcing gas under pressure there through. The measurement of the back pressure represents the depth of the liquid and enables the rapid determination of the rate of flow. It is contemplated that the portable apparatus be interconnected with a portable continual recorder such that the flow may be monitored over any given, desired, time period.

5 Claims, 3 Drawing Figures

FLOW MONITORING APPARATUS

This is a continuation, of application Ser. No. 503,392 filed Sept. 5, 1974, now U.S. Pat. No. 3,965,740.

BACKGROUND OF THE INVENTION

Whereas it has always been important to design a fluid flow system to accommodate the maximum demand. This has been fairly regularly accomplished when a stable demand has been predicted. In the past raw sewage has been combined with natural drainage and the drainage system has included drain pipes larger than the predicted normal flow to accommodate all flows at all times so it would not back up under times of unexpected demand. With the increased interest and concern for the environment and health of our expanding population it is important to channel raw sewage into one sewer system for proper treatment prior to discharge and the natural drainage or storm sewage and ground water into another system, which, because of its lack of contaminants may be discharged with little or no preliminary treatment. For reasons of efficiency, as well as best usage of treatment facilities, it is imperative that the system for handling raw sewage handle nothing more than raw sewage. The raw sewage will be fed into raw sewage treatment plants without overloading the facility and the environmental danger eliminated. It is for this reason that those systems which handle raw sewage must be monitored to predict any unpredicted increase in demand due to storm inflow or ground water infiltration. The monitoring of the flow further enables an observer to quickly recognize an increase and/or decrease caused by a failure of the sewage system which admits ground water infiltration or surface drainage into the system or alternatively releases raw sewage to the surrounding environment.

With the need for a monitoring program employing portable, continuously recording equipment in mind it has been suggested, and in many cases actively pursued, that the fluid flow within existing raw sewage systems be monitored either on a continual basis or intermittently over a period of time such that infiltration, inflow and the increase and/or decrease in demand be readily predicted and accommodated.

A means for determining the flow within an open conduit is through the use of the Manning flow relationship wherein if the pipe size is known, the slope of the pipe or conduit, and the material of the conduit as well as the recorded depth, then using the Manning formula the flow can be determined. One method of recording the depth in the past has been through the use of a "Manning dipper" which essentially is a plumb bob lowered through a manhole entry to the sewer liquid flow surface. It would record the depth of the liquid in the manhole and thus the flow could be approximately be determined. One of the disadvantages of the Manning dipper lies in the fact that it, as noted above, normally is dropped down a manhole which is normally an area of disturbed flow. The liquid flows out of a conduit into the manhole base, which is not coincident with the internal surface of the conduit and thus disturbances are generated effectively changing the depth at that point from what is actually is in the pipe where properties are known. Further, the Manning dipper, when used in a sewer, which transports raw sewage often becomes contaminated and the measurement is thus distorted by the interaction or hang-up of the various particles and material carried by the fluid within the sewer. These interference items cause the approximate pipe depth reading to be even less accurate.

With the above noted disadvantages of the present flow measuring techniques in mind it is an object of the present invention to provide a portable means whereby the flow within an existing regular open channel conduit may be readily and reasonably accurately determined without great costs and further, with far greater accuracy than heretofore possible.

It is another object of the present invention to provide a method whereby the depth within an open channel may be continuously recorded without requiring full time operator surveillance.

Further it is an object of the present invention to provide a novel apparatus for readily measuring the depth of flow in an open channel thus enabling the rate of flow within the channel to be accurately determined.

It is a further object of the present invention to provide an apparatus which consists of a hollow probe which extends linearly into the channel a sufficient distance to avoid disturbances within the manhole and a means for placing and securing that probe accurately such that the depth of flow may be consistently determined without continual surveillance.

It is yet another object of the present invention to provide an apparatus which includes a recording device, a source of gas under pressure and an elongated hollow probe with an orifice in the outermost end such that the gas forced through the outermost end will bubble through the flowing liquid in the open channel. The resistance to the outward flow of the gas can be recorded and thus determine the depth of liquid over the probe and thereby, by use of the Manning formula, the rate of flow of the liquid within the channel.

It is still another object of the present invention to provide a portable means to determine the rate of flow within an open channel wherein the apparatus for determining said flow is located very near the wall of the channel and therefore at a position of theoretical zero velocity, greatly decreasing the possibility of interference with the flow or interference of the measurement by solid particles within the liquid flow.

DETAILED DESCRIPTION OF DRAWINGS

Figure 1:
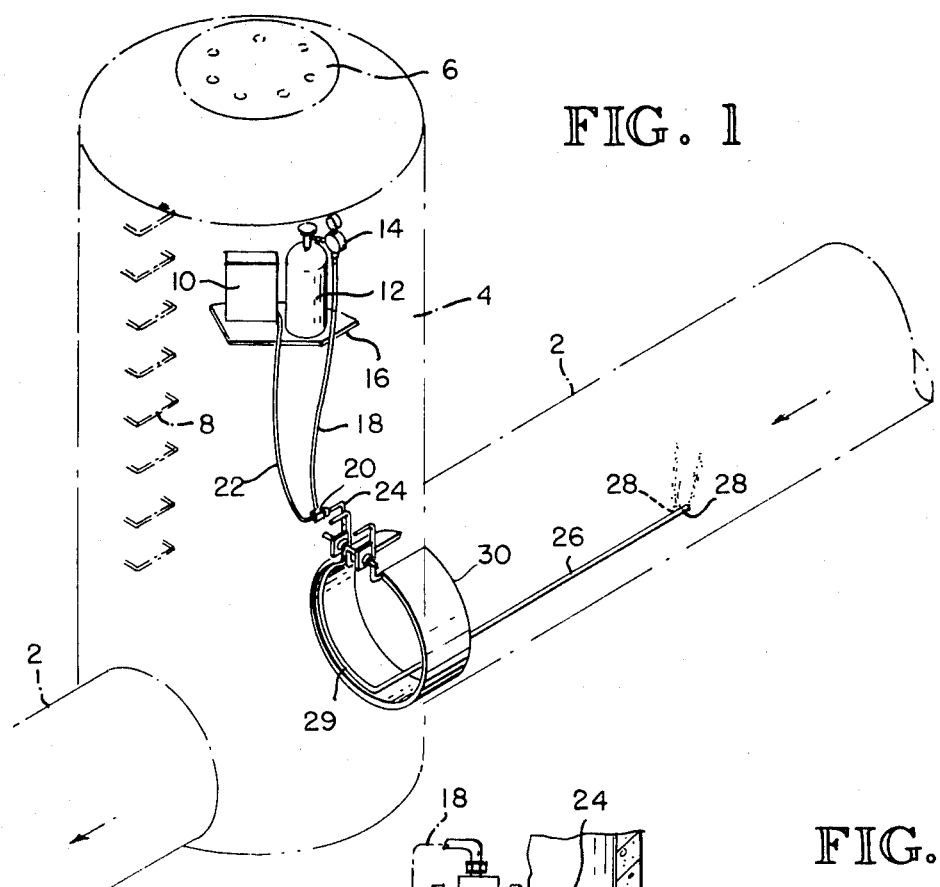
FIG. 1 is an environmental view disclosing the flow measuring apparatus wherein the recorder and the air supply tank are located within the manhole of a sewer system and the supporting collar and the probe itself are located within the conduit which carries the flow of liquid.

As seen in FIG. 1, the preferred embodiment and use of the present invention is in a sewage flow line as schematically shown which has hollow cylindrical flow pipes 2 periodically interspersed with manholes 4 having manhole openings 6 and ladders or the like 8 leading to the lower portions of the manhole. The manhole opening and ladder permit inspection of the system and placement of the flow meter within the sewer pipe as shown. As can be seen in this view, the liquid flowing within the sewer pipe, when it reaches the intersection with the manhole, will be caused to change to an uneven or disturbed flow which will greatly affect any depth measurements taken within the channel bottom of manhole 4.

The present invention which is a complete portable measuring and recording package includes a recording device 10 which is an off-the-shelf or standard item and therefore will not be described in great detail, but it is understood that it must be capable of recording a differential in pressure as to be explained hereinafter. The recorder 10 and the portable supply of pressurized air 12 in the form of a tank having a flow regulator 14 mounted thereon are shown as mounted upon shelf 16 within the manhole but could equally well be secured to the ladder 8 or otherwise placed within the manhole. It is only required that their location is relatively secure and above the normal expected flow within the sewer and yet in the interest of compactness of the entire package, reasonably accessible.

The interconnection between the pressurized bottle 12 and the recorder 10 is by way of a conduit 18 leading to a T-connection 20 having extending outwardly therefrom a conduit 22 leading back to the recorder 10 as well as the hollow conduit 24 which is semi-rigid and extends downwardly following the contour of the pipe and as explained hereinafter, extends linearly upstream into the interior of the sewer pipe to be directly effected by the pressure created by the depth of liquid flowing over the outer end thereof.

As can be seen in this view the probe 26 is a long, thin, hollow tube extending linearly into the channel, lying in the cradle thereof and having a through bore 28 extending transversely there through and having the end of the tube closed. The tube is placed in the cradle such that the bore 28 lies in a horizontal plane. When the probe 26 is thus placed it has two openings to the liquid at the same depth allowing a reasonably accurate approximation of the depth of the liquid even if one of the holes should become plugged or the flow of gas otherwise impeded. Having two openings directly opposite each other permits a balancing of the pressures and therefore results in a more accurate reading when measuring fluid such as sewage having large particles therein. The probe lies in the cradle of the pipe and extends from a position upstream of the manhole where the gas releasing ports are located to a position adjacent the manhole opening at which point it forms an approximate semi-circle. The curved portion 29 is interconnected at its upper end with the semi-rigid conduit 24 as described above. The semi-circular portion 29 lies inside a collar 30 and is contiguous therewith. The collar 30 has sufficient width to assure alignment with the conduit such that the probe 26 is parallel to the bottom of the conduit 2 and is expandable by means explained hereinafter such that the collar may be fixedly secured within the conduit 2.

Figure 2:
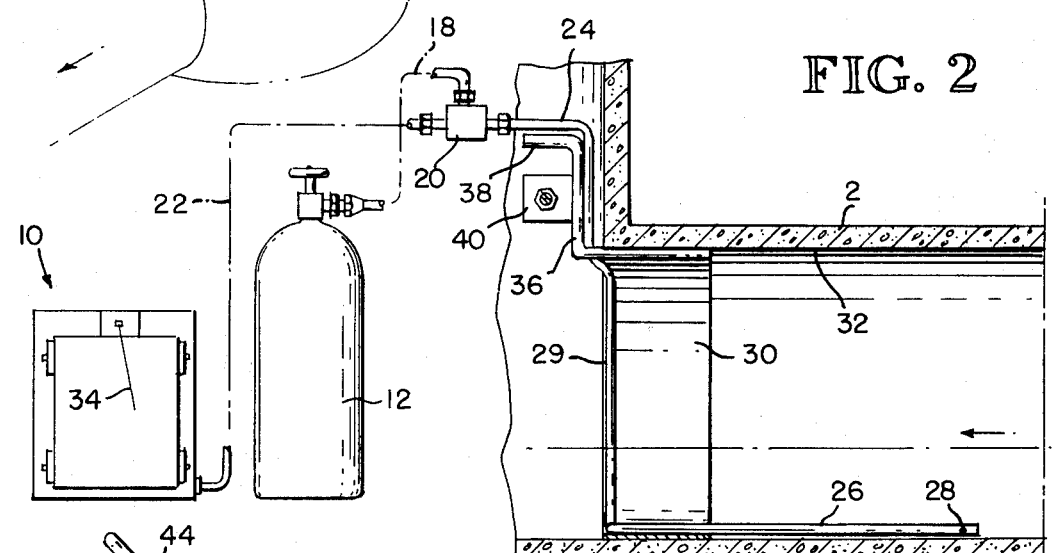
FIG. 2 is a partially schematic view emphasizing the location of the probe and the probe supporting collar and their interconnection with the air supply tank and the flow meter, however, with the air supply tank and flow meter displaced for clarity.

Referring now to FIG. 2, it can be seen that the collar 30 is intimately engaged with the interior surface 32 of the conduit 2 and thus is at a position of theoretical zero velocity preventing interference and/or hang-up with the solids or semi-solids within the flow. The probe 26 extends longitudinally into the conduit 2 and lies within the cradle thereof and therefore is very close to the bottom of the conduit and also in a position of theoretical zero velocity. The semi-circular portion 29 of the probe is secured adjacent the interior of the collar 30 and does not vary therefrom until the upper portion thereof, a position which is normally outside the expected flow. As can be seen the semi-rigid conduit portion 24 extends into a T-connection 20 and thus into a conduit 18 leading to a pressurized tank 12 as well as into a conduit 22 leading into a recorder 10 having a needle 3A or some other means of recording the back pressure generated by attempting to force the pressurized gas within the tank 12 through the probe 26 and its associated horizontal openings 28.

Figure 3:
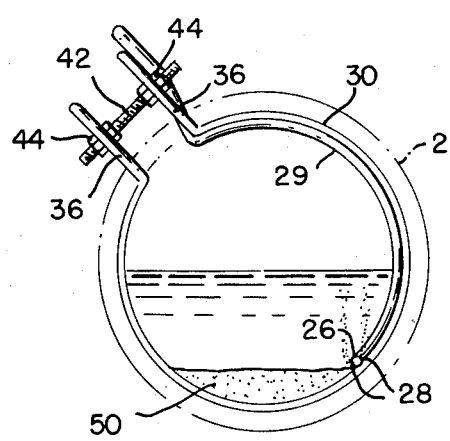
FIG. 3 is an elevational view of the collar and probe showing how the collar and probe will be displaced in the event there is substantial sludge in the bottom of the channel and further depicting how the collar will be locked into position within the channel.

Referring now to FIG. 3, the means for locking the collar 30 in position within the conduit 2 may more readily be seen. As seen in this figure, the collar is not a complete circle and has secured to its outer ends radially outwardly extending handle means 36 which terminates in axially directed handle portions 38.

As best seen in FIG. 2, the collar includes a plate 40 secured to the radial portion of each of the handles 36 and has extending there through as seen in FIG. 3 a threaded bolt 42 having nuts 44 adjacent each of the brackets 40. When it is desired to place the collar and attached probe within the conduit 2, the collar may be compressed to a smaller diameter, slipped into position and then allowed to expand. The collar is locked in place by means of the interior nuts 44. Further as seen in FIG. 3 the semi-spherical portions 29 of the conduit is closely married to the collar 30 thus possessing minimal impedance and lies in the position of theoretical zero velocity.

FIG. 3, besides showing the details of the collar, and its locking mechanism further discloses the means for approximating the depth of the fluid in a conduit 2 wherein a significant amount of sludge 50 has collected at the bottom. In conditions such as this, the probe 26 is placed at approximately the upper surface of the sludge 50 and thus the depth between the sludge and the top of the flowing liquid is measured. Depending upon the depth of the sludge 50, the accuracy of this installation will be determined, however, any changes in the flow will still be readily determined by a change in the actual depth as measured.

Thus, as can be seen the present invention provides an efficient as well as an inexpensive portable means for continually monitoring the flow of liquid within an open channel. The amount of time that the monitoring system can be left to function and record any changes in depth will be directly dependent upon the amount of gas under pressure within the pressurized tank and the amount of time available for recording. The present invention provides a unique approach and method to accurately monitor the flow in an open channel and because of the placement of the various devices does not restrict the flow within the channel and thus renders an accurate measurement, a measurement which is accurately reflective of the flow which existed prior to the placement of the measuring device.

What is claimed is:

1. Portable flow-monitoring apparatus for use in a cylindrical water or sewer pipe, comprising a flexible collar-like structure adapted to fit within an open end of the pipe and contiguous with the inside wall of the pipe, having the intended upper portion of the collar-like structure separated into a pair of ends adapted to be spaced farther apart or closer together to flex the collar-like structure circumferentially, including means adjacent the respective ends and adapted to expand the collar-like structure for frictional retention in place against the inside wall of the pipe and, in contrast, to contract it for ready removal therefrom, sensor means mounted on part thereof and including a bubble outlet, and a bubble fluid conductor extending from outside the collar-like structure to the inside wall thereof and through about a semicircle in contact therewith and to the sensor means and bubble outlet.

2. In apparatus for monitoring liquid flow under open-channel conditions through a cylindrical sewer or water pipe or conduit wherein sensor means is located adjacent the invert or bed of the inside wall thereof, and including a bubble outlet, the improvement comprising a conductor for bubble fluid from the exterior to an interior location adjacent such bed, the conductor extending from the exterior to the interior along an upper portion of the pipe or conduit and then in a circumferential direction downward, confined closely adjacent such inside wall throughout its interior extent to such bed, thereby minimizing interference with such liquid flow, the apparatus including also means for applying lateral friction against such inside wall to aid in retaining such sensor means and bubble conductor in place, wherein the means fo applying lateral friction includes an expansible collar attached to the sensor means and bubble fluid conductor.

3. Flow-monitoring apparatus according to claim 2, wherein the bubble fluid conductor extends circumferentially along about half the inside perimeter of the expansible collar from its entrance thereinto from the exterior to its lowermost extend therein.

4. In apparatus for monitoring flow in an open conduit, the combination of mounting means adapted to be secured within the conduit and only along the inside wall thereof to minimize flow disturbance and having a pair of ends adjacent one another but normally spaced apart, each end carrying manually engageable means by which the ends may be positioned more closely adjacent and also adjustment means by which the ends may be spaced further apart, and hollow pressure-sensing means adapted to be supported by the mounting means to extend from the exterior into the conduit only adjacent the inside wall thereof to minimize flow disturbance and to terminate adjacent the flow bed.

5. Flow-monitoring apparatus according to claim 4, wherein the means carried by the ends extend outwardly therefrom and thereby are precluded from entering the conduit.

* * * * *